US009071088B2

United States Patent
Numaguchi et al.

(10) Patent No.: US 9,071,088 B2
(45) Date of Patent: Jun. 30, 2015

(54) AXIAL GAP TYPE GENERATOR

(71) Applicant: Fuji Jukogyo Kabushiki Kaisha, Tokyo (JP)

(72) Inventors: Kazuya Numaguchi, Tokyo (JP); Hiroyuki Hisada, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 222 days.

(21) Appl. No.: 13/741,997

(22) Filed: Jan. 15, 2013

(65) Prior Publication Data

US 2013/0187489 A1 Jul. 25, 2013

(30) Foreign Application Priority Data

Jan. 19, 2012 (JP) ................................. 2012-009042

(51) Int. Cl.
| | |
|---|---|
| *H02K 5/04* | (2006.01) |
| *H02K 5/06* | (2006.01) |
| *H02K 5/18* | (2006.01) |
| *H02K 7/18* | (2006.01) |
| *H02K 9/22* | (2006.01) |
| *H02K 21/24* | (2006.01) |

(52) U.S. Cl.
CPC .. *H02K 5/04* (2013.01); *H02K 9/22* (2013.01); *H02K 21/24* (2013.01); *H02K 5/06* (2013.01); *H02K 5/18* (2013.01); *H02K 7/1807* (2013.01)

(58) Field of Classification Search
CPC ..... H02K 7/006; H02K 7/1815; H02K 16/04; H02K 21/24; H02K 1/28; H02K 1/30; H02K 16/00; H02K 5/04; H02K 5/06; H02K 7/18; H02K 7/187; F02B 63/04; F02B 63/044; F02B 63/42
USPC .................... 310/156.35, 406–409, 413, 415; 180/53.5, 65.31; 123/3; 290/1 A; 903/951, 952
See application file for complete search history.

(56) References Cited

U.S. PATENT DOCUMENTS

| 7,004,800 | B2 * | 2/2006 | Mori et al. ........................ 440/6 |
| 8,154,165 | B2 | 4/2012 | Yoshida et al. | |
| 2003/0184173 | A1 | 10/2003 | Hashimoto et al. | |
| 2004/0232702 | A1 * | 11/2004 | He .................................. 290/31 |
| 2005/0179337 | A1 * | 8/2005 | Hasebe et al. ................. 310/268 |
| 2007/0227470 | A1 * | 10/2007 | Cole et al. ........................ 123/3 |

(Continued)

FOREIGN PATENT DOCUMENTS

| JP | 10-004650 A | 1/1998 | |
| JP | 2002238214 A * | 8/2002 | ............... H02K 7/18 |

(Continued)

OTHER PUBLICATIONS

Hibi, JP2002238214 Machine Translation, Aug. 2002.*

(Continued)

*Primary Examiner* — Quyen Leung
*Assistant Examiner* — Eric Johnson
(74) *Attorney, Agent, or Firm* — McGinn IP Law Firm, PLLC.

(57) ABSTRACT

There is provided an axial gap type generator exhibiting improved precision in positioning stator cores. An axial gap type generator comprises a generator case fixed to a crank case of an engine, a rotor yoke housed inside the generator case, and fixed to a crankshaft of the engine, and a first stator core and a second stator core fixed to generator case inner faces, and disposed flanking the rotor yoke in a rotation axis direction. The generator case is configured through direct connection of a first member to which the first stator core is fixed and a second member to which the second stator core is fixed.

12 Claims, 3 Drawing Sheets

(56) References Cited

U.S. PATENT DOCUMENTS

2009/0071784 A1* 3/2009 Combs et al. ............... 192/3.21
2009/0230694 A1  9/2009 Yoshida et al.

FOREIGN PATENT DOCUMENTS

| | | |
|---|---|---|
| JP | 2005-160197 A | 6/2005 |
| JP | 2005-522166 A | 7/2005 |
| JP | 2006-50752 A | 2/2006 |
| JP | 2009-216014 A | 9/2009 |
| JP | 2010-038006 A | 2/2010 |

OTHER PUBLICATIONS

Notification of Reason(s) for Refusal dated Dec. 3, 2013.

* cited by examiner

AXIAL GAP TYPE GENERATOR

CROSS-REFERENCE TO RELATED APPLICATIONS

The present application claims priority from Japanese Patent Application No. 2012-009042, filed on Jan. 19, 2012, the entire contents of which are hereby incorporated by reference.

BACKGROUND OF THE INVENTION

1. Field of the Invention

The present invention relates to an axial gap type generator that is mounted on an engine, and more particularly, to an axial gap type generator in which the precision in positioning stator cores is increased.

2. Description of the Related Art

For general-purpose engines or the like for industrial use include instances where, for example, there is known a configuration in which a generator is connected to one end of a crankshaft protruding out of an engine main body.

For instance, a technique disclosed in Japanese Unexamined Patent Application Publication (JP-A) No. H10-4650 provides magnets for power generation at a flywheel that is fixed to the crankshaft end of a motorcycle engine, and coils for power generation, the coils being fixed to the engine, at sites that oppose the magnets in the radial direction.

Furthermore, in recent years, the use of an axial gap type generator has been proposed for compact generator configurations. In the axial gap type generator, stator cores that are fixed to the engine and are provided with power generation coils, and rotor yokes that are provided with magnets for power generation and rotate together with a crankshaft are disposed opposing one another in the center axis direction of the crankshaft.

For instance, Japanese Unexamined Patent Application Publication No. 2009-216014 discloses an axial gap type generator in which a stator core that is fixed to an engine is disposed in spacing between a pair of rotor yokes that are disposed, protruding from a crankshaft, towards the outer diameter side, and that are spaced apart from each other in the axial direction.

Also, in an axial gap type generator disclosed JP-A No. 2010-038006, protrusions that are integrally formed with a stator are directly connected with a support member on the side of an engine, thereby enhancing the positioning precision of a stator core with respect to the engine.

In axial gap type generators such as those described above, the efficiency of the generator depends on the axial-direction gap between a stator core and a rotor yoke. Therefore, it is important to set the gap with good precision.

In the case where a pair of stator cores that oppose each other across a rotor yoke is fixed by way of a plurality of interposed parts, however, there arises the problem of increased variability in the stator core spacing, due to the unavoidable accumulation of dimensional tolerances in the manufacture of the parts.

SUMMARY OF THE INVENTION

The present invention has been designed in consideration of the circumstances described above, and an object thereof is to provide an axial gap type generator in which the positioning precision of stator cores is increased.

A first aspect of the present invention provides an axial gap type generator that includes: a generator case fixed to a crank case of an engine; a rotor yoke housed inside the generator case, and fixed to a crankshaft of the engine; and a first stator core and a second stator core fixed to an inner face of the generator case, and disposed flanking the rotor yoke in a rotation axis direction. The generator case is configured by direct connection of a first member, to which the first stator core is fixed, and a second member, to which the second stator core is fixed.

As a result, those members that exert an influence on the spacing of the first and second stator cores, on account of dimensional tolerances, are only the first member and the second member of the generator case, and there is no accumulation of dimensional tolerances of other parts. Accordingly, this allows increasing the positioning precision of the stator cores.

Preferably, the first member and second member of the generator case are formed of an aluminum alloy.

An aluminum alloy having comparatively high thermal conductivity is used herein; as a result, dissipation of heat from the interior of the generator towards the exterior can be promoted and rises in internal temperature curbed. Drops in power generation efficiency can be prevented thereby.

Preferably, the first member and the second member have respectively cooling fins formed on an outer surface section thereof.

As a result, cooling of the interior of the generator can be promoted without incurring an increase in the number of parts.

Preferably, an engaging unit for relatively positioning the first member and the second member within a plane perpendicular to a rotation axis of the crankshaft is provided at an engaging section of the first member and the second member.

Such an engaging unit may be configured, for instance, in the form of a socket-and-spigot joint at an engaging site of the first member and the second member, or through formation of a protrusion in one of the members and a recess in the other member, with insertion of the protrusion into the recess.

As a result, the first member and the second member can be connected to each other with good precision, and there can be increased the positioning precision of the first and the second stator cores.

DESCRIPTION OF THE PREFERRED EMBODIMENTS

Hereinafter, an embodiment of the axial gap type generator that utilizes the present invention is explained.

The axial gap type generator of the embodiment is mounted on one of the ends of a crankshaft of a general-purpose engine for industrial use, for example.

Figure 1:
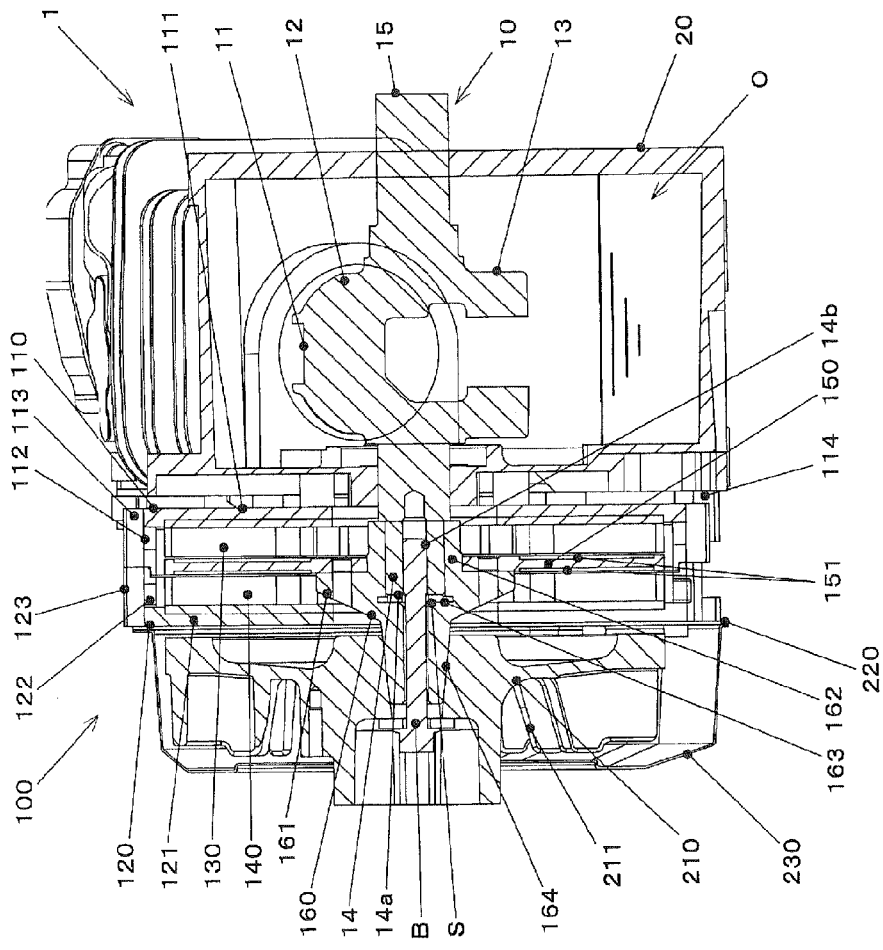
FIG. 1 is a cross-sectional diagram of an engine that is provided with an axial gap type generator according to an embodiment of the present invention.

FIG. 1 is a cross-sectional diagram of an engine provided with the axial gap type generator of the embodiment.

Figure 2:
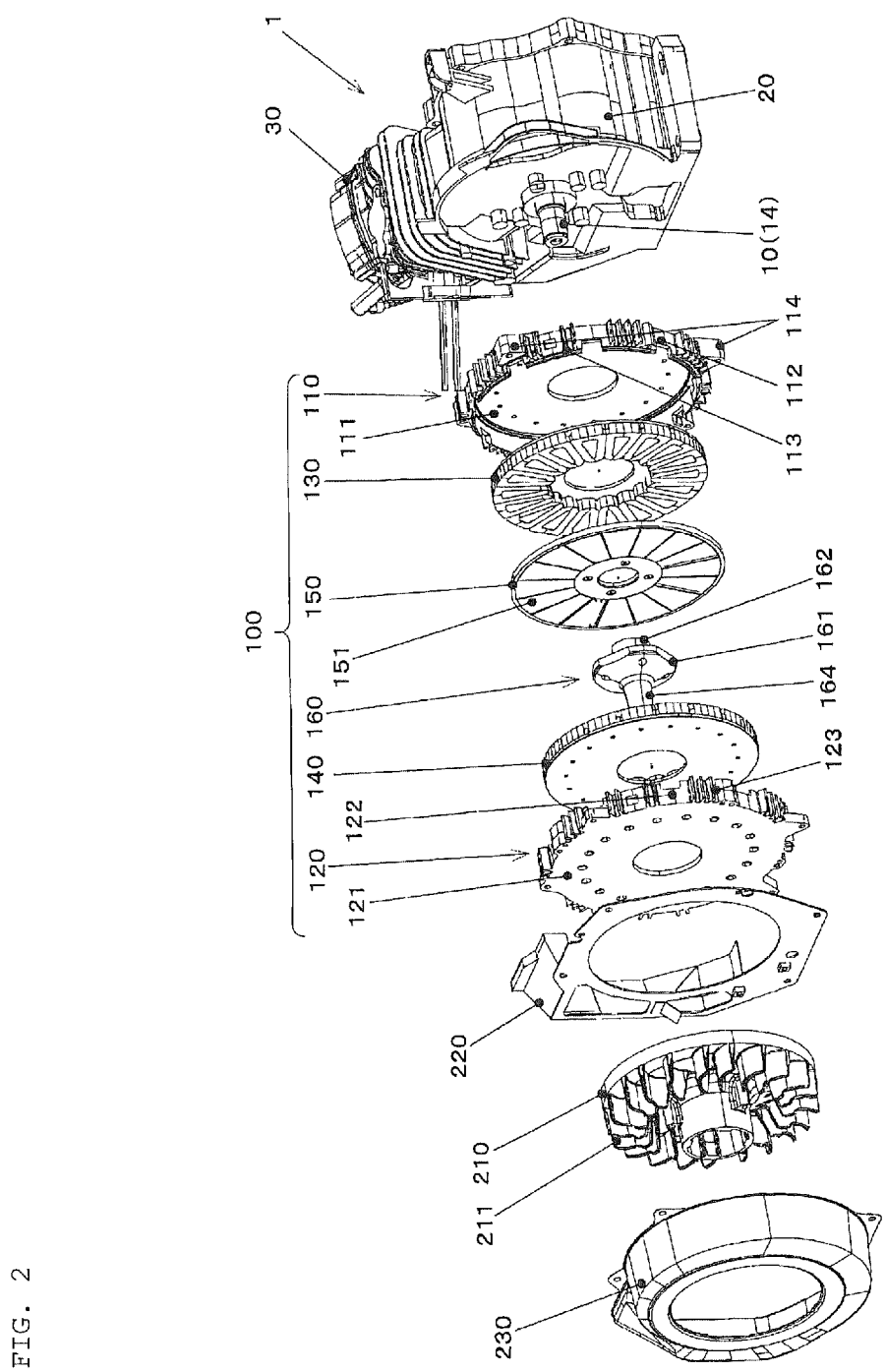
FIG. 2 is an exploded perspective-view diagram of the engine and of the axial gap type generator of FIG. 1.

FIG. 2 is an exploded perspective-view diagram of the engine and of the axial gap type generator of FIG. 1.

The engine 1 is, for instance, a single-cylinder four-stroke OHC gasoline engine.

The engine 1 includes a crankshaft 10, a crank case 20 and so forth.

The crankshaft 10, which is an output shaft of the engine 1, is rotatably supported on a bearing that is provided in the crank case 20.

At an intermediate portion thereof, the crankshaft 10 is provided with, for instance, a crank pin 11, a crank arm 12, a crank weight 13 and the like, and is supported on bearings on both sides.

The crankshaft 10 has output shafts 14 and 15 that protrude from both sides of the crank case 20.

The output shaft 14 drives a below-described axial gap type generator 100 that is mounted on the output shaft 14.

An end face 14a at the leading end of the output shaft 14 is formed to a planar shape that extends in a direction perpendicular to the axial direction.

A screw hole 14b is formed from the end face 14a along the axial direction. The screw hole 14b co-fastens a flywheel 210 and an adapter 160 that fixes a rotor yoke 150 of the axial gap type generator 100.

The output shaft 15 is a portion to which there is connected a device, not shown, that is to be driven.

The crank case 20 is a container-like member that houses and rotatably supports the intermediate portion of the crankshaft 10.

A cylinder unit of the engine 1 is integrally formed in the crank case 20. For instance, a cylinder head 30 (FIG. 2) provided with intake and exhaust ports, a valve train, a drive system thereof, spark plugs and so forth, is mounted at the cylinder unit.

As illustrated in FIG. 1, oil O for lubrication of the engine 1 is stored in the crank case 20, at the bottom.

The axial gap type generator 100 is mounted on the engine 1.

The axial gap type generator 100 includes, for instance, a front case 110, a rear case 120, a front stator core 130, a rear stator core 140, the rotor yoke 150, the adapter 160 and the like.

The front case 110 and the rear case 120 are configured in the form of two split cases, divided in the axial direction, that constitute a housing (generator case) in which the constituent members of the axial gap type generator 100 are housed.

Figure 3:
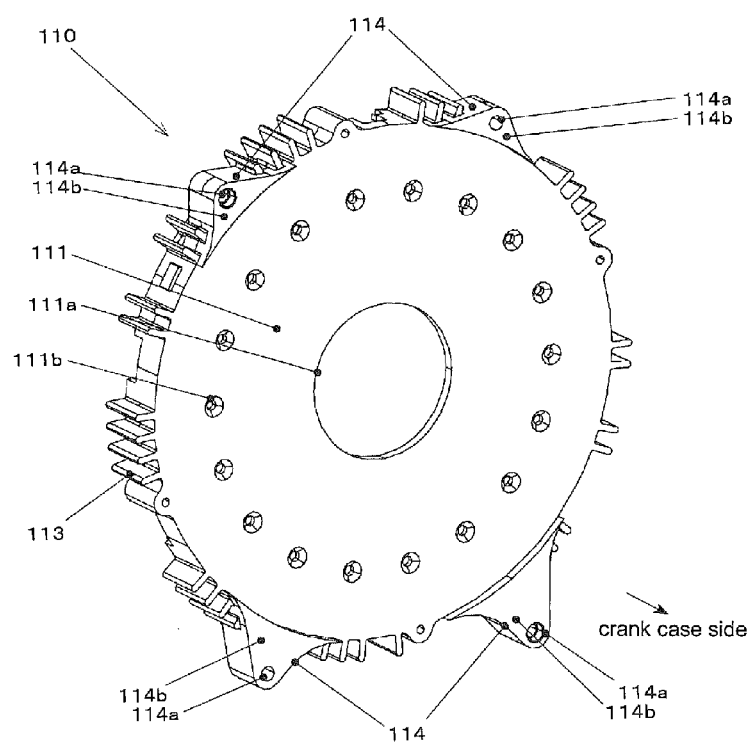
FIG. 3 is an external perspective-view diagram of a generator case of the axial gap type generator of FIG. 1.

FIG. 3 is an external perspective-view diagram of the front case viewed from the crank case.

The front case 110 is integrally formed with a disc 111, a peripheral wall 112, cooling fins 113, mounting sections 114 and the like by, for instance, die-casting of an aluminum alloy.

The disc 111 is a plate-like and disc-like portion that is disposed along a plane that is perpendicular to the center axis of the crankshaft 10.

An opening 111a is formed at the central section of the disc 111. The crankshaft 10 is inserted through the opening 111a.

Screw holes 111b that are used for fastening the front stator core 130 are formed, distributed in the peripheral direction, in the disc 111.

The peripheral wall 112 is a surface section that extends, from the outer peripheral edge of the disc 111, along the axial direction of the crankshaft 10, towards the side opposite to the crank case 20.

The cooling fins 113 are formed protruding, in the radial direction, from the outer peripheral face of the peripheral wall 112.

The cooling fins 113 are formed as a plurality of fin shapes that are distributed in the peripheral direction of the front case 110, and that extend along the direction of flow of cooling air that is generated by a below-described blower fan 211.

The cooling air flows through the spacings between the cooling fins 113 towards the cylinder head 30.

The mounting sections 114 constitutes a generator case support that serves as a base at which the front case 110 is fixed to the crank case 20.

As illustrated in FIG. 3, for instance, four mounting sections 114 are provided, distributed in the peripheral direction of the disc 111, the mounting sections 114 being formed protruding from the outer peripheral edge of the disc 111 of the front case 110 towards the outer diameter side.

The mounting sections 114 are disposed at the outer diameter side, for the outer peripheral edges of the front stator core 130 and the rear stator core 140.

Each of the mounting sections 114 has a bolt hole 114a. A bolt that fastens the front case 110 to the crank case 20 is inserted through bolt hole 114a.

Abutting face sections 114b are disposed, protruding in the form of steps, on the disc 111, on the crank case 20 side. The mounting sections 114 abut the crank case 20 at abutting face sections 114b.

As a result, some spacing is provided between the disc 111 and the crank case 20 upon fastening of the front case 110 to the crank case 20.

Connection sites for connecting the mounting sections 114 and the crank case 20 are disposed apart from the area at which high-temperature oil O is stored, with the crank case 20 viewed in the axial direction of the crankshaft 10.

The rear case 120 is disposed on the opposite side of the crank case 20 across the front case 110.

The rear case 120 is integrally formed with a disc 121, a peripheral wall 122, cooling fins 123 and the like by, for instance, die-casting of an aluminum alloy.

The disc 121 is plate and disc shaped, and is disposed along a plane that is perpendicular to the center axis of the crankshaft 10.

An opening is formed at the central section of the disc 121. The adapter 160 is inserted through this opening. The opening is formed substantially in the same way as the opening 111a of the front case 110.

Screw holes for fastening the rear stator core 140 are formed in the disc 121 such that they are distributed in the peripheral direction. These screw holes are formed substantially in the same way as the screw holes 111b of the front case 110.

The peripheral wall 122 is a surface section that extends, from the outer peripheral edge of the disc 121, along the axial direction of the crankshaft 10, towards the crank case 20 (towards the front case 110).

The peripheral wall 112 of the front case 110 and the peripheral wall 122 of the rear case 120 are joined in a state where the leading end edges of the peripheral walls abut each other, and are fastened by way of bolts or the like.

In order to enhance the relative alignment precision between the front case 110 and the rear case 120, portions of the leading end of the peripheral wall 112 on the inner diameter side of the front case 110 protrude, in the form of a step, towards the rear case 120, while at the leading end of the peripheral wall 122 there are formed stepped recesses onto which these protrusions fit.

The front case 110 and the rear case 120 are positioned through a so-called "socket-and-spigot joint" such that the protrusions of the peripheral wall 112 fit onto the recesses of the peripheral wall 122.

The cooling fins 123 protrude in the radial direction from the outer peripheral face of the peripheral wall 122.

The cooling fins 123 are formed substantially in the same way as the cooling fins 113 of the front case 110 described above.

The cooling fins 113 and the cooling fins 123 are disposed at overlapping positions, in the peripheral direction, around the axial gap type generator 100. The cooling fins 113 and the cooling fins 123 are formed so as to configure a substantially continuous surface section.

The front stator core 130 and the rear stator core 140 have, for instance, power generation coils configured in the form of windings that are wound around an iron core.

The front stator core 130 is mounted on the surface section on the rear case 120 side of the disc 111 of the front case 110.

The rear stator core 140 is mounted on the surface section on the front case 110 side of the disc 121 of the rear case 120.

The front stator core 130 and the rear stator core 140 are formed split into a plurality of pieces in the peripheral direction, such that each piece is fastened to discs 111 and 121 by way of screws.

The front stator core 130 and the rear stator core 140 are disposed opposing each other in the axial direction of the crankshaft 10.

The rotor yoke 150 is configured through mounting of permanent magnets 151 for power generation on both sides of a disc-like member that has an opening in the central section.

The rotor yoke 150 is disposed between the front stator core 130 and the rear stator core 140, with a predetermined gap left between the stator cores.

The rotor yoke 150 is fixed to the crankshaft 10 by way of the below-described adapter 160, and rotates relatively with respect to the stator cores 130 and 140 during the operation of the engine 1.

The adapter 160 is fixed to the output shaft 14 of the crankshaft 10, and the rotor yoke 150 is fixed to the adapter 160.

The adapter 160 is integrally formed with a disc 161, a tubular section 162, a shim clamper 163 and a flywheel mounting section 164.

The inner diameter-side portion of the rotor yoke 150 is fastened to the outer diameter-side portion of the disc 161. The disc 161 is plate and disc shaped.

The disc 161 is disposed inside the rear case 120 such that the position of the disc 161 in the axial direction of the crankshaft 10 is in the vicinity of the leading end of the output shaft 14.

The rotor yoke 150 is mounted on the surface section on the crank case 20 side of the disc 161.

The tubular section 162 is cylinder shaped and protrudes from the surface section on the crank case 20 side of the disc 161. The output shaft 14 of the crankshaft 10 is inserted into the tubular section 162.

The shim clamper 163 is a surface section that forms a bottom face of the tubular section 162, and is plane shaped in a direction perpendicular to the rotation axis direction of the crankshaft 10.

A disc-like shim S for adjusting the axial-direction position of the rotor yoke 150 is clamped between the shim clamper 163 and the end face 14a of the output shaft 14 of the crankshaft 10.

The thickness of the shim S is set in such a manner that the rotor yoke 150 is disposed so as to leave appropriate gaps with respect to the front stator core 130 and the rear stator core 140.

Specifically, for instance, the distance, in the axial direction of the crankshaft 10, between the end face 14a of the output shaft 14 and a site for measurement is measured, the site being set beforehand, at the crank case 20 or at a member fixed thereto. A shim is selected that has a thickness corresponding to the measured distance, on the basis of prepared correlation data of distance-shim thickness.

The flywheel mounting section 164 is shaped as a tapered shaft and protrudes from the disc 161 to the side opposite to the crank case 20.

The flywheel 210 of the engine 1 is mounted on the flywheel mounting section 164.

As illustrated in FIG. 1, the flywheel 210 and the adapter 160 are co-fastened and fixed to the crankshaft 10 with a high-tension bolt B.

Connection strength can be secured easily by thus configuring the flywheel mounting section 164 in the shape of a tapered shaft.

The blower fan 211 that generates cooling air during rotation is integrally formed with the flywheel 210.

The flywheel 210 is provided with a blower housing base 220 and a blower housing 230 respectively on the crank case 20 side and on the opposite side of the crank case 20.

The blower housing base 220 and the blower housing 230 are fixed to the rear case 120 and are disposed surrounding the flywheel 210, including the blower fan 211. The blower housing base 220 and the blower housing 230 form an air flow path in which cooling air passes by the cooling fins 113 and 123 and reaches the cylinder and the cylinder head 30.

The embodiment explained above elicits the following effects.

(1) The front case 110 and the rear case 120, on which the front stator core 130 and the rear stator core 140 are respectively mounted, are configured through direct connection of the end faces of the peripheral walls 111 and 121; as a result, those members that exert an influence on the spacing of the stator cores 130 and 140, on account of dimensional tolerances, are only the front case 110 and the rear case 120, and there is no accumulation of dimensional tolerances of other parts. Accordingly, this allows increasing the positioning precision of the stator cores 130 and 140.

(2) An aluminum alloy having comparatively high thermal conductivity is used as the material of the front case 110 and the rear case 120; as a result, dissipation of heat from the interior of the axial gap type generator 100 towards the exterior can be promoted and rises in internal temperature curbed. Drops in power generation efficiency can be prevented thereby.

(3) The cooling fins 113 and 123 are formed in the front case 110 and the rear case 120. As a result, cooling of the interior of the axial gap type generator 100 can be promoted without incurring an increase in the number of parts.

(4) The front case 110 and the rear case 120 are positioned through a socket-and-spigot joint, and, as a result, position precision in the radial direction is secured easily. This effect is brought out also, for instance, upon mounting of a pulser coil for detection of ignition timing.

The present invention is not limited to the embodiment explained above, and may accommodate various alterations and modifications, which lie within the technical scope of the present invention.

The shape, structure, material, manufacturing method, disposition and so forth of the various members that constitute the engine and the axial gap type generator are not limited to those in the configuration of the above-described embodiment, and can be appropriately altered.

In the embodiment, for instance, the front case and the rear case have each a respective peripheral wall, but the peripheral wall may be formed in just one of the cases, while the other case remains a substantially plate-like case.

In the embodiment, positioning of the front case and the rear case is achieved by way of a socket-and-spigot joint, but the embodiment is not limited thereto, and positioning may be accomplished using some other way, for instance by way of a boss projection a boss hole and the like.

What is claimed is:

1. An axial gap type generator, comprising: a generator case fixed to a crank case of an engine; a rotor yoke housed inside the generator case, and fixed to a crankshaft of the engine; a first stator core and a second stator core fixed to an inner face of the generator case, and disposed flanking the rotor yoke in a rotation axis direction, wherein the generator case is configured by a direct connection of a first member, to which the first stator core is fixed, and a second member, to which the second stator core is fixed, and wherein the generator case includes a mounting section that is formed and protrudes from an outer peripheral edge and an outer diameter side of the generator case, and is fastened to the crank case; and an adaptor that engages the rotor yoke with the crankshaft between the first stator and the second stator, the adaptor comprising a disk disposed between the second stator and the rotor yoke, wherein the rotor yoke is fastened to a surface of the disk that faces the crank case.

2. The axial gap type generator according to claim 1, wherein the first member and second member of the generator case comprise an aluminum alloy.

3. The axial gap type generator according to claim 1, wherein the first member and the second member respectively include cooling fins formed on an outer surface section thereof.

4. The axial gap type generator according to claim 1, wherein an engaging unit for relatively positioning the first member and the second member within a plane perpendicular to a rotation axis of the crankshaft is provided at an engaging section of the first member and the second member.

5. The axial gap type generator according to claim 1, wherein, in an axial direction of the axial gap type generator, the disk is located inside the second member such that an opposing surface of the disk to the surface of the disk faces the second stator.

6. The axial gap type generator according to claim 5, wherein the adaptor further comprises a tubular section that protrudes from the disk toward the crank case, an output shaft of the crankshaft being inserted into the tubular section.

7. The axial gap type generator according to claim 6, wherein, in the axial direction of the axial gap type generator, the rotor yoke is located on the tubular section between the surface of the disk and the first stator.

8. The axial gap type generator according to claim 7, wherein the adaptor further comprises a flywheel mounting section that protrudes in the axial direction of the axial gap type generator from the opposing surface of the disk in a direction opposite to the crank case.

9. The axial gap type generator according to claim 8, wherein, in the axial direction of the axial gap type generator, the second stator is located on the second member between the opposing surface of the disk and the second member.

10. The axial gap type generator according to claim 9, wherein the flywheel mounting section comprises a tapered shaft.

11. The axial gap type generator according to claim 10, further comprising:
a flywheel mounted on the flywheel mounting section for blowing cooling air into the engine.

12. The axial gap type generator according to claim 11, wherein, in the axial direction of the axial gap type generator, the second member is located between the flywheel and the second stator.

* * * * *